July 4, 1961            I. MANNING            2,990,608

METHOD OF MAKING SHEET METAL ELEMENTS WITH PASSAGES THEREIN

Filed March 18, 1957

INVENTOR
IVOR MANNING

BY Cushman, Darby & Cushman
ATTORNEYS

United States Patent Office 2,990,608
Patented July 4, 1961

2,990,608
METHOD OF MAKING SHEET METAL ELEMENTS WITH PASSAGES THEREIN
Ivor Manning, Sutton Coldfield, England, assignor to Imperial Chemical Industries Limited, London, England, a corporation of Great Britain
Filed Mar. 18, 1957, Ser. No. 646,755
6 Claims. (Cl. 29—157.3)

This invention is concerned with a method of making metal sheets with passages therein which involves the use of stop-weld materials.

In one method of manufacture of refrigerator evaporator panels two sheets of metal having a separation pattern of stop-weld material therebetween are heated to a temperature of several hundred degrees centigrade and pressure welded together by passing them through rolls. Welding is prevented in the area delineated by the separation pattern and the subsequent application of hydraulic or gaseous pressure to this area results in local expansion of the metal, and passages corresponding to the separation pattern are formed within the welded sheet. Among the stop-weld materials previously suggested as being suitable for application to the sheets in the form of the separation pattern are coal, or chalk, or a mixture of graphite in water glass.

Such stop-weld materials, whilst effective in preventing welding, have the disadvantage that a deposit is left on the walls of the passages after the passages have been formed. The presence of a deposit in the passages may, in subsequent use of the panels, give rise to blockages or help to promote corrosion of the passages. It is, therefore, necessary to clean out the passages after using such stop-weld materials.

An object of this invention is to provide stop-weld materials in which these disadvantages are lessened.

A further object of this invention is to provide an improved method of making metal sheets with passages therein which involves the use of stop-weld materials.

According to the invention we provide a method for making a sheet metal element having passages therein, which comprises cold rolling together two metal sheets with stop-weld material therebetween, the said stop-weld material being an organic polymeric material and conforming to the pattern of passages but being foreshortened in the direction of rolling and then inflating the non-welded areas between the welded sheets.

Inflation may be effected, for example, by heating the welded sheets to a temperature between the temperature of rolling and the melting point of the metal, at which the stop-weld material is gaseous. The pressure generated by the gas thus expands the passages.

The stop-weld material may be used in the form of film or thin sheet, its shape conforming with the desired pattern of passages, inserted between the metal sheets, but a more convenient method is to apply the material to the surface of one of the metal sheets by a printing process. The printing medium may be a solution or liquid dispersion of the stop-weld material, which, after application, is dried leaving a film of the material in the form of the separation pattern.

From the many stop-weld materials which are suitable, particularly satisfactory results are obtained from the following:

(a) An aqueous dispersion of polymerised ethylene. A suitable aqueous dispersion may be stabilised by an amine stearate type of emulsifying agent.

(b) A solution of methyl methacrylate polymer in benzyl alcohol. Conveniently, polythene powder may be added to the solution as a pigment if there is any tendency for the solution to spread over the sheet from its derived position.

(c) A solution of poly-isobutylene in tetra-hydronaphthalene.

The strength of these solutions is not critical, but its viscosity must be suitable for the process being used for printing the separation pattern. Each of the above solutions has been applied successfully by the silk-screen process and dried under infra-red radiation.

When heated up to a temperature between, say, 400° C. and 600° C. these materials decompose into gases and where the pattern does not extend to the edge or edges of the sheets the pressure created by the formation of these gases may be utilised to expand the metal to form passages corresponding to the stop-weld pattern. An adequate quantity of the stop-weld material must be applied in order to create, when the sheet is heated to a specific temperature, sufficient pressure to expand the passages to the desired size. This heating operation may coincide with an annealing operation.

On the other hand, the gases may be allowed to escape by providing, before the heating operation, an outlet in the stop weld pattern, for example, by cutting through the metal at a suitable position to expose the stop-weld material, or by extending the pattern, at some point to an edge of the welded sheets. The passages may be subsequently expanded by pressure from an external source such as hydraulic pressure.

Alternatively, instead of heating the sheet, the passages may be inflated at room temperature by the application of hydraulic pressure from an external source.

Since no residue is left when the improved stop-weld material is used, it is not necessary to clean out the passages.

One embodiment of the invention is illustrated in the accompanying drawings, of which:

Figure 1:
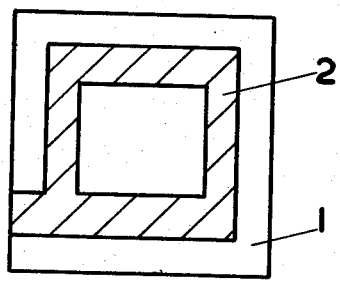
FIGURE 1 is a plan view of a sheet of metal with a pattern of stop-weld material printed thereon.
Figure 2:
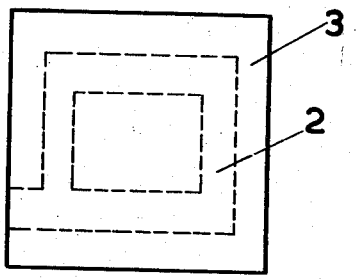
FIGURE 2 is a plan view of two sheets of metal with a stop-weld material between them, prior to cold rolling.
Figure 3:
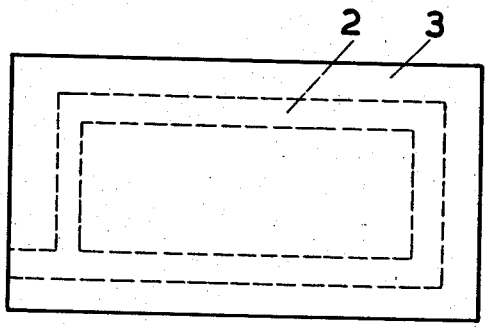
FIGURE 3 is a view similar to FIGURE 2 showing the two sheets after cold rolling.
Figure 4:
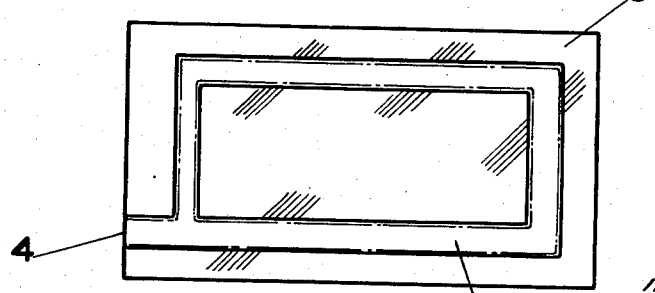
FIGURE 4 is a view of the rolled sheets with passages therein.

Referring to the drawings, a sheet of aluminum 1 has printed thereon, by a silk-screen process, a pattern 2 of a suitable solution of methyl methacrylate polymer in benzyl alcohol to which has been added polythene powder. After drying by means of infra-red heat, a similar sheet of aluminum, 3 is placed on the sheet 1 and tacked thereto at the edges by spot-welding.

The two sheets are then cold-rolled together and during the rolling operation the two sheets become pressure welded together except over the area occupied by the printed solution of stop-weld material.

The nozzle of a hydraulic device is then inserted into the non-welded part 4 at the edge of the two plates and the non-welded areas are inflated by the application of hydraulic pressure to provide the desired pattern of passages 5 between the sheet.

It will be appreciated that, in order to obtain welding during the rolling operation, the two sheets must be subjected to preliminary degreasing and cleaning operations. Furthermore, the pattern of stop-weld material as printed on the sheet must be foreshortened in the direction of rolling so as to provide the desired pattern of passages after rolling.

We claim:

1. A method for making an aluminum sheet element having passages therein, comprising the steps of cold-rolling together two aluminum sheets with a pattern of stop-weld material therebetween and with sufficient pressure to pressure weld said sheets together, said stop-weld material consisting essentially of organic polymeric material and being adapted to change into gaseous state at elevated temperature without residue, inflating the non-welded areas between the welded sheets to form passages, and heating the composite to completely gasify the stop-weld material, whereby blockages of the passages and promotion of corrosion by solid residue therein are obviated.

2. A method as defined in claim 1, wherein said pattern does not extend to any one edge of the composite, and the gasification of the stop-weld material at elevated temperature is utilized to inflate the non-welded areas to form the passages.

3. A method as defined in claim 1, wherein said stop-weld material consisting essentially of polymerized ethylene.

4. A method as defined in claim 1, wherein said stop-weld material consisting essentially of polymerized ethylene and an amine-stearate type emulsifying agent.

5. A method as defined in claim 1, wherein said stop-weld material consisting essentially of methyl methacrylate polymer.

6. A method as defined in claim 1, wherein said stop-weld material consisting essentially of poly-isobutylene.

References Cited in the file of this patent

UNITED STATES PATENTS

| | | |
|---|---|---|
| 2,212,481 | Sendzimir | Aug. 20, 1940 |
| 2,609,068 | Pajak | Sept. 2, 1952 |
| 2,714,760 | Boam et al. | Aug. 9, 1955 |
| 2,766,514 | Adams | Oct. 16, 1956 |
| 2,772,180 | Neel | Nov. 27, 1956 |